(12) United States Patent
Foster

(10) Patent No.: US 9,807,995 B2
(45) Date of Patent: Nov. 7, 2017

(54) INSECT TRAPPING DEVICE

(71) Applicant: John Foster, Minnesota Lake, MN (US)

(72) Inventor: John Foster, Minnesota Lake, MN (US)

( * ) Notice: Subject to any disclaimer, the term of this patent is extended or adjusted under 35 U.S.C. 154(b) by 447 days.

(21) Appl. No.: 14/640,064

(22) Filed: Mar. 6, 2015

(65) Prior Publication Data

US 2016/0255824 A1   Sep. 8, 2016

(51) Int. Cl.
*A01M 3/00* (2006.01)
*A01M 3/02* (2006.01)

(52) U.S. Cl.
CPC ............ *A01M 3/005* (2013.01); *A01M 3/025* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,279,095 A * | 7/1981 | Aasen | ................ | A01K 13/002 15/352 |
| 4,607,451 A * | 8/1986 | Jarecki | ................ | A01M 3/005 15/344 |
| 5,052,147 A * | 10/1991 | Broomfield | ........... | A01M 3/005 43/139 |
| 5,222,322 A * | 6/1993 | Mastromonaco | ..... | A01M 1/026 43/139 |
| 5,241,779 A | 9/1993 | Lee | | |
| 5,301,458 A | 4/1994 | Deyoreo et al. | | |
| 5,402,598 A * | 4/1995 | Wade | ................ | A01M 1/06 43/134 |
| 6,202,343 B1 * | 3/2001 | Mah | ................ | A01M 3/005 43/112 |
| 6,226,919 B1 * | 5/2001 | Septer | ................ | A01M 1/06 43/139 |
| 6,640,489 B1 * | 11/2003 | Boulton | ................ | A01M 1/06 43/139 |
| 6,675,528 B2 | 1/2004 | Jablin | | |
| 8,595,894 B1 * | 12/2013 | Kakish | ................ | A47L 5/24 15/339 |
| 2003/0101638 A1 * | 6/2003 | Wyers | ................ | A01M 1/06 43/139 |
| 2005/0246944 A1 | 11/2005 | Flowers | | |
| 2006/0080887 A1 * | 4/2006 | Chen | ................ | A01M 1/08 43/113 |
| 2006/0248786 A1 * | 11/2006 | Wolf | ................ | A01M 3/005 43/139 |

(Continued)

FOREIGN PATENT DOCUMENTS

WO   WO2013115555   8/2013

*Primary Examiner* — Christopher P Ellis

(57) ABSTRACT

An insect trapping device traps, kills and facilitates disposal of an insect. The device includes a handle which is hollow defining a conduit extending between a first end and a second end. A fan coupled to the handle in the conduit such that the fan provides suction into the first end of the handle. A cup is coupled to the first end of the handle for directing an insect into the first end of the handle. A receptacle is coupled to the second end of the handle and vented end such that the fan urges air flow out through the receptacle wherein the receptacle receives and holds the insect sucked through the first end of the handle.

12 Claims, 4 Drawing Sheets

(56) References Cited

U.S. PATENT DOCUMENTS

| | | | | |
|---|---|---|---|---|
| 2007/0169403 A1* | 7/2007 | Collins | ................... | A01M 1/06 43/139 |
| 2008/0120897 A1 | 5/2008 | Miller et al. | | |
| 2009/0313881 A1* | 12/2009 | Troutman | ............ | A01K 13/002 43/107 |
| 2012/0024986 A1* | 2/2012 | Shouji | ................... | A01M 3/005 239/526 |
| 2012/0055073 A1* | 3/2012 | Darby | ................... | A01M 3/005 43/107 |
| 2012/0137569 A1* | 6/2012 | Younts | ................. | A01M 3/005 43/139 |
| 2014/0013655 A1* | 1/2014 | Southard | .............. | A01M 3/005 43/139 |

\* cited by examiner

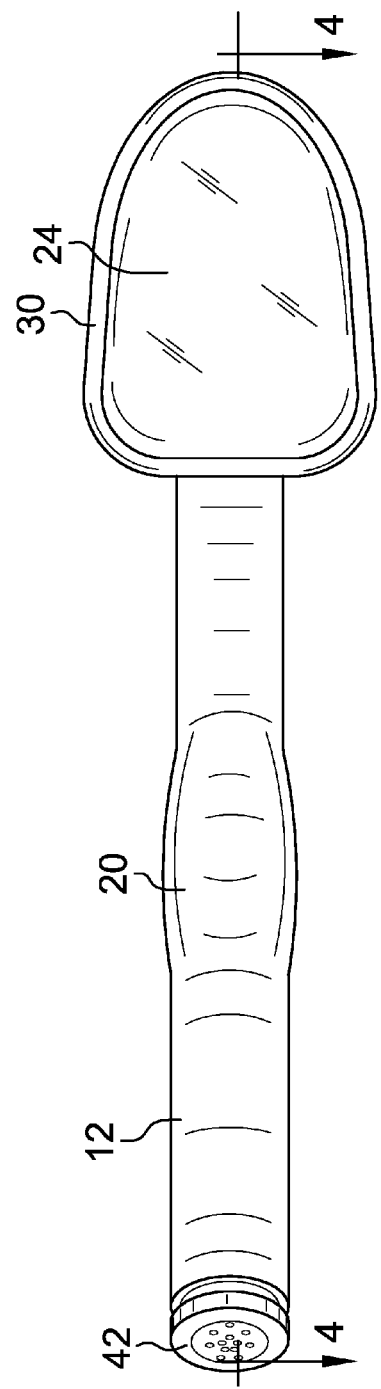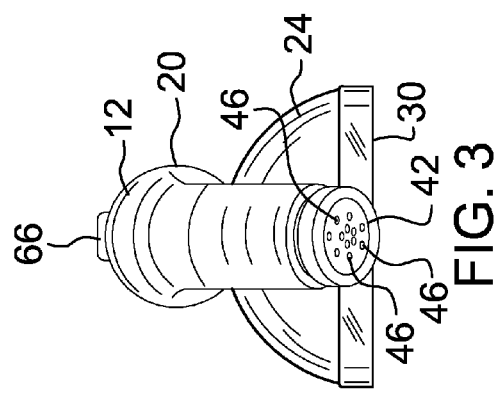

INSECT TRAPPING DEVICE

BACKGROUND OF THE DISCLOSURE

Field of the Disclosure

The disclosure relates to trapping devices and more particularly pertains to a new trapping device for trapping, killing, and facilitating disposal of an insect.

SUMMARY OF THE DISCLOSURE

An embodiment of the disclosure meets the needs presented above by generally comprising a handle which is hollow defining a conduit extending between a first end and a second end. A fan coupled to the handle in the conduit such that the fan provides suction into the first end of the handle. A cup is coupled to the first end of the handle for directing an insect into the first end of the handle. A receptacle is coupled to the second end of the handle and vented end such that the fan urges air flow out through the receptacle wherein the receptacle receives and holds the insect sucked through the first end of the handle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 2 is a bottom view of an embodiment of the disclosure.

FIG. 3 is a rear view of an embodiment of the disclosure.

DESCRIPTION OF THE PREFERRED EMBODIMENT

Figure 1:
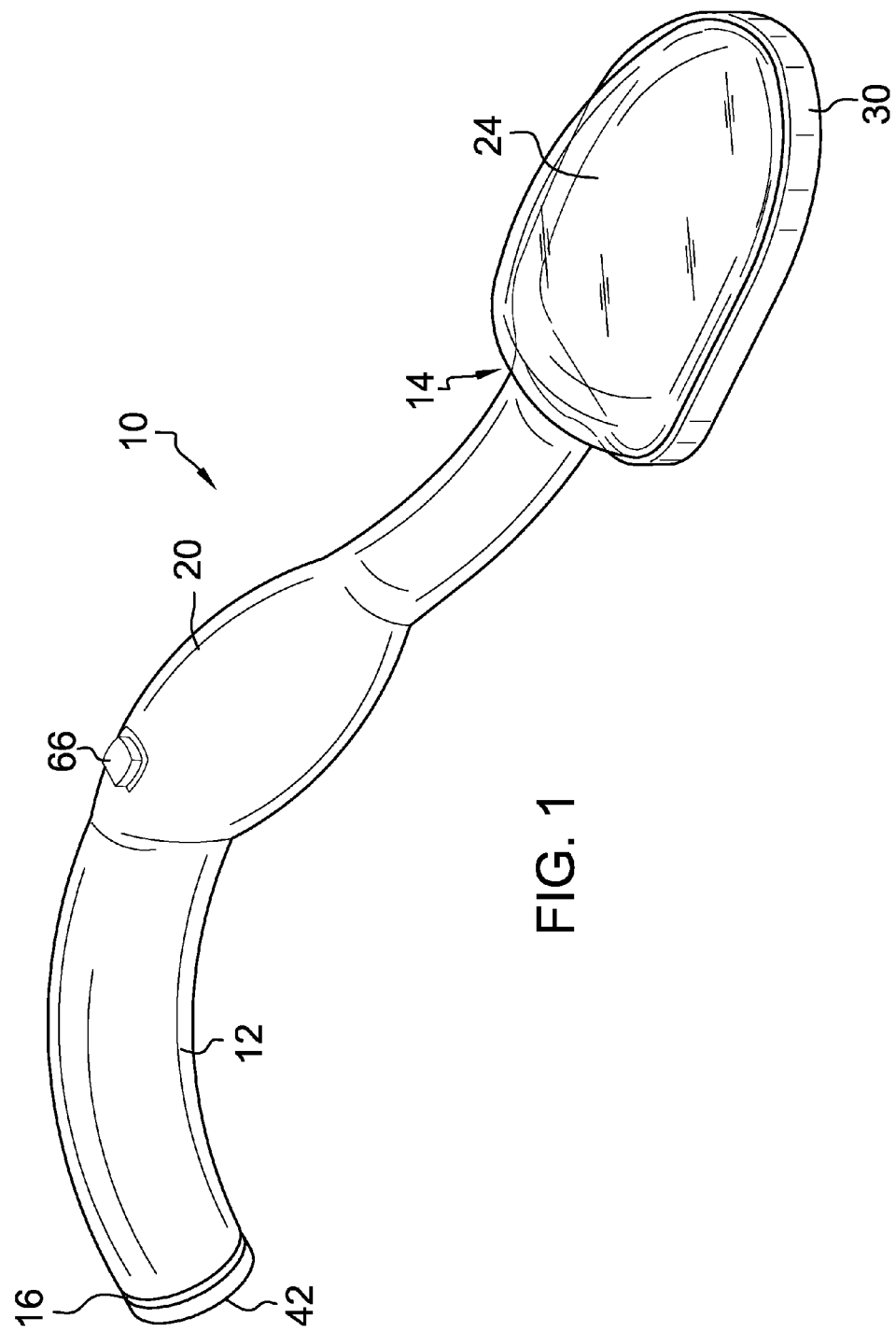
FIG. 1 is a top front side perspective view of a insect trapping device according to an embodiment of the disclosure.
Figure 4:
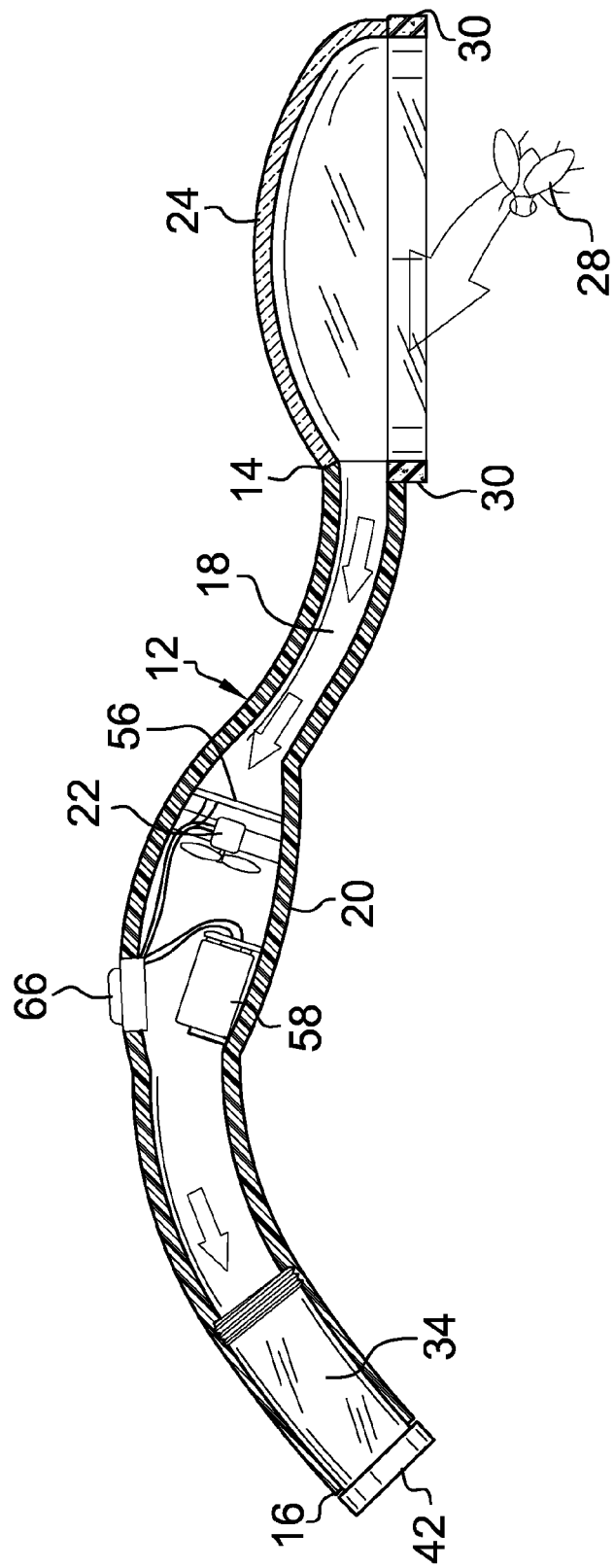
FIG. 4 is a cross-sectional view of an embodiment of the disclosure taken along line 4-4 of FIG. 2.
Figure 5:
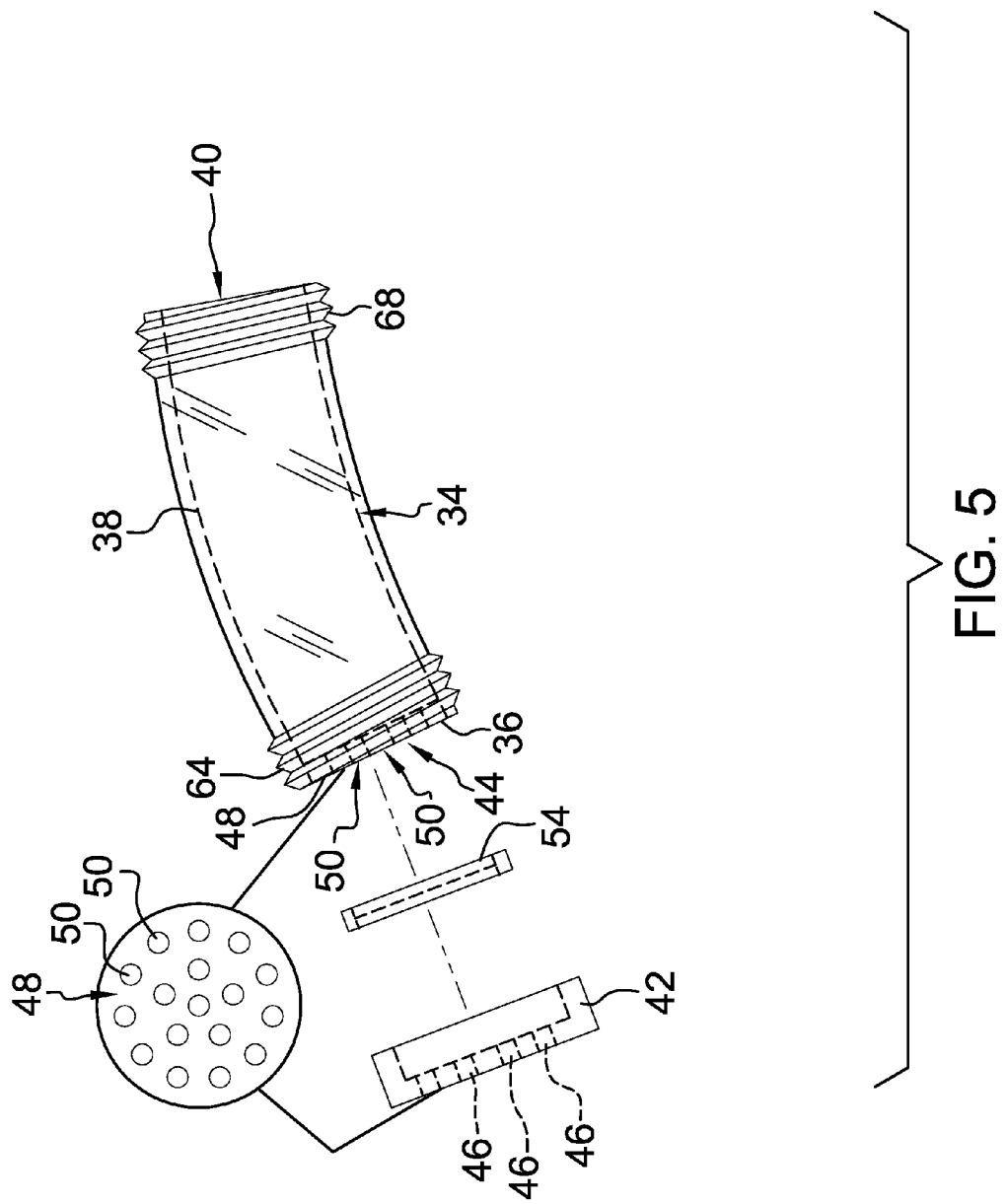
FIG. 5 is an exploded detailed view of a rear section of an embodiment of the disclosure.

With reference now to the drawings, and in particular to FIGS. 1 through 5 thereof, a new trapping device embodying the principles and concepts of an embodiment of the disclosure and generally designated by the reference numeral 10 will be described.

As best illustrated in FIGS. 1 through 5, the insect trapping device 10 generally comprises a handle 12 having a first end 14 and a second end 16. The handle 12 is hollow extending between the first end 14 and the second end 16 wherein the handle 12 defines a conduit 18 extending between the first end 14 and the second end 16. The handle 12 is arcuate extending between the first end 14 and the second end 16. The handle 12 has a bulbous medial section 20. A fan 22 is coupled to the handle 12. The fan 22 is positioned in the conduit 18 such that the fan 22 provides suction into the first end 14 of the handle 12. The fan 22 is positioned in the bulbous medial section 20 of the handle 12.

A cup 24 is coupled to the first end 14 of the handle 12. The cup 24 has an opening 26 aligned with the first end 14 such that the cup 24 is configured for directing an insect 28 positioned proximate the cup 24 into and through the first end 14 of the handle 12 when the insect 28 comes close to the cup 24. The cup 24 is transparent allowing a person to see the insect 28 moving into the first end 14 of the handle 12. A rubber gasket 30 is coupled to the cup 24. The rubber gasket 30 lines an edge 32 of the cup 24 preventing scuffing or other like damage to surfaces contacted by the edge 32.

A receptacle 34 is coupled to the second end 16 of the handle 12. The receptacle 34 has a vented end 36 such that the fan 22 urges air flow from the conduit 18 out through the receptacle 34. Thus, the receptacle 34 is configured for receiving and holding the insect 28 sucked through the first end 14 of the handle 12. The receptacle 34 includes a tube 38 having an open end 40 coupleable to the second end 16 of the handle 12 by threading or the like. A cap 42 is removably coupled to an end 44 of the tube 38 opposite the open end 40. The cap 42 is vented by a plurality of holes 46. An end wall 48 is coupled to the tube 38 at the end 44 opposite the open end 40. The end wall 48 is structured to include a plurality of apertures 50 extending through the end wall 48. The apertures 50 are substantially aligned with the holes 46 when the cap 42 is coupled to the tube 38 such that the fan 22 urges air flow outwardly through the cap 42. Thus, the receptacle 34 is configured for collecting the insect 28 into the receptacle 34. A filter 54 is coupled to the receptacle 34. The filter 54 is positionable inset within a cutout 56 in the cap 42. The tube 38 has threaded sections 64,68 and is inset into the second end 16 of the handle 12 when attached.

A wire 56 is exposed within the conduit 18 between the first end 14 and the second end 16. The wire 56 is positioned in the bulbous medial section 20 of the handle 12 closer to the first end 14 of the handle 12. The conduit 18 is unobstructed between the first end 14 of the handle 12 and the wire 56. The wire 56 is positioned to contact the insect 28 as the insect 28 passes through the conduit 18 but not fully obstruct passage of the insect 28 through to the receptacle 34. A power source 58 is coupled to the handle 12. The power source 58 is electrically coupled to the fan 22. The power source 58, which may be a battery 60, provides an electrical current to the wire 56 wherein the wire is configured for stunning or killing the insect 28 when the insect 28 contacts the wire 56 as the insect 28 passes through the conduit 18. The power source 58 is positioned in the bulbous medial section 20 of the handle 12 between the fan 22 and the second end 16 of the handle 12. A switch 66 is electrically coupled between the power source 58 and each of the fan 22 and the wire 56 wherein the fan 22 and the wire 56 are selectively actuated by manipulation of the switch 66.

In use, the switch 66 is manipulated to activate the fan 22 and provide power to the wire 56. The handle 12 is then held and manipulated to position the cup 24 sufficiently close to the insect 28 to cause the insect 28 to be sucked into the first end 14 of the handle 12. The insect 28 contacts the wire 56 as the insect 28 is urged through the handle towards the receptacle 34. The receptacle 34 is removed from the handle 12 to allow for disposal of the insect 28.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An insect trapping device comprising:
   a handle having a first end and a second end, said handle being hollow extending between said first end and said second end wherein said handle defines a conduit extending between said first end and said second end;
   a fan coupled to said handle, said fan being positioned in said conduit such that said fan provides suction into said first end of said handle;
   a cup coupled to said first end of said handle such that said cup is configured for directing an insect positioned proximate said cup into said first end of said handle; and
   a receptacle coupled to said second end of said handle, said receptacle having a vented end such that said fan urges air flow from said conduit out through said receptacle wherein said receptacle is configured for receiving and holding the insect sucked through said first end of said handle;
   a wire exposed within said conduit between said first end and said second end; and
   a power source coupled to said handle, said power source providing an electrical current to said wire wherein said wire is configured for killing the insect when the insect contacts said wire as the insect passes through said conduit.

2. The device of claim 1, wherein said receptacle comprises:
   a tube having an open end coupleable to said second end of said handle;
   a cap removably coupled to an end of said tube opposite said open end, said cap being vented by a plurality of holes.

3. The device of claim 2, further comprising a filter coupled to said receptacle.

4. The device of claim 3, further comprising said filter being positionable inset within a cutout in said cap.

5. The device of claim 2, further comprising an end wall coupled to said tube at said end opposite said open end, said end wall being structured to include a plurality of apertures extending through said end wall, said apertures being substantially aligned with said holes when said cap is coupled to said tube such that said fan urges air flow outwardly through said cap wherein said receptacle is configured for collecting the insect.

6. The device of claim 1, further comprising said cup being transparent.

7. The device of claim 1, further comprising a rubber gasket lining an edge of said cup.

8. The device of claim 1, further comprising said handle being arcuate extending between said first end and said second end.

9. The device of claim 1, further comprising said handle having a bulbous medial section, said fan being positioned in said bulbous medial section of said handle.

10. The device of claim 2, further comprising said handle having a bulbous medial section, said wire and said power source being positioned in said bulbous medial section of said handle.

11. The device of claim 2, further comprising a switch electrically coupled between said power source and each of said fan and said wire wherein said fan and said wire are selectively actuated by manipulation of said switch.

12. An insect trapping device comprising:
   a handle having a first end and a second end, said handle being hollow extending between said first end and said second end wherein said handle defines a conduit extending between said first end and said second end, said handle being arcuate extending between said first end and said second end, said handle having a bulbous medial section;
   a fan coupled to said handle, said fan being positioned in said conduit such that said fan provides suction into said first end of said handle, said fan being positioned in said bulbous medial section of said handle;
   a cup coupled to said first end of said handle such that said cup is configured for directing an insect positioned proximate said cup into said first end of said handle, said cup being transparent;
   a rubber gasket lining an edge of said cup;
   a receptacle coupled to said second end of said handle, said receptacle having a vented end such that said fan urges air flow from said conduit out through said receptacle wherein said receptacle is configured for receiving and holding the insect sucked through said first end of said handle, said receptacle comprising
      a tube having an open end coupleable to said second end of said handle,
      a cap removably coupled to an end of said tube opposite said open end, said cap being vented by a plurality of holes, and
      an end wall coupled to said tube at said end opposite said open end, said end wall being structured to include a plurality of apertures extending through said end wall, said apertures being substantially aligned with said holes when said cap is coupled to said tube such that said fan urges air flow outwardly through said cap wherein said receptacle is configured for collecting the insect;
   a filter coupled to said receptacle, said filter being positionable inset within a cutout in said cap;
   a wire exposed within said conduit between said first end and said second end, said wire being positioned in said bulbous medial section of said handle;
   a power source coupled to said handle, said power source being electrically coupled to said fan, said power source providing an electrical current to said wire wherein said wire is configured for killing the insect when the insect contacts said wire as the insect passes through said conduit, said power source being positioned in said bulbous medial section of said handle; and a switch electrically coupled between said power source and each of said fan and said wire wherein said fan and said wire are selectively actuated by manipulation of said switch.

* * * * *